United States Patent [19]
Raymond

[11] 3,778,152
[45] Dec. 11, 1973

[54] MOBILE CAMERA ASSEMBLY
[76] Inventor: Gary E. Raymond, Box 531, Kenvil, N.J. 07847
[22] Filed: July 19, 1971
[21] Appl. No.: 163,880

[52] U.S. Cl. ............................................... 355/56
[51] Int. Cl. .......................................... G03b 27/32
[58] Field of Search .................. 355/18, 27, 58, 62, 355/72, 56

[56] References Cited
UNITED STATES PATENTS

| | | | |
|---|---|---|---|
| 3,314,350 | 4/1967 | Husum | 355/58 X |
| 2,163,776 | 6/1939 | Current | 355/72 |
| 2,402,107 | 6/1946 | Wekeman | 355/18 |
| 1,543,015 | 6/1925 | Lare | 355/58 |
| 2,397,668 | 4/1926 | Kesses | 355/58 |
| 2,593,318 | 4/1952 | Lehmann | 355/62 |
| 3,040,640 | 6/1962 | Abel | 355/27 |

Primary Examiner—John M. Horan
Attorney—Bernard J. Murphy

[57] ABSTRACT

The assembly comprises a camera and copyboard, together with a platen, having a gear train and handwheel arrangement by means of which both the camera and copyboard are moved simultaneously. The single handwheel effects the movement of both the camera and copyboard, relative to the platen, and the camera moves in a linear motion while the copyboard moves non-linearly, to realize a reduction or enlargement of the photographic objective borne by the copyboard.

8 Claims, 15 Drawing Figures

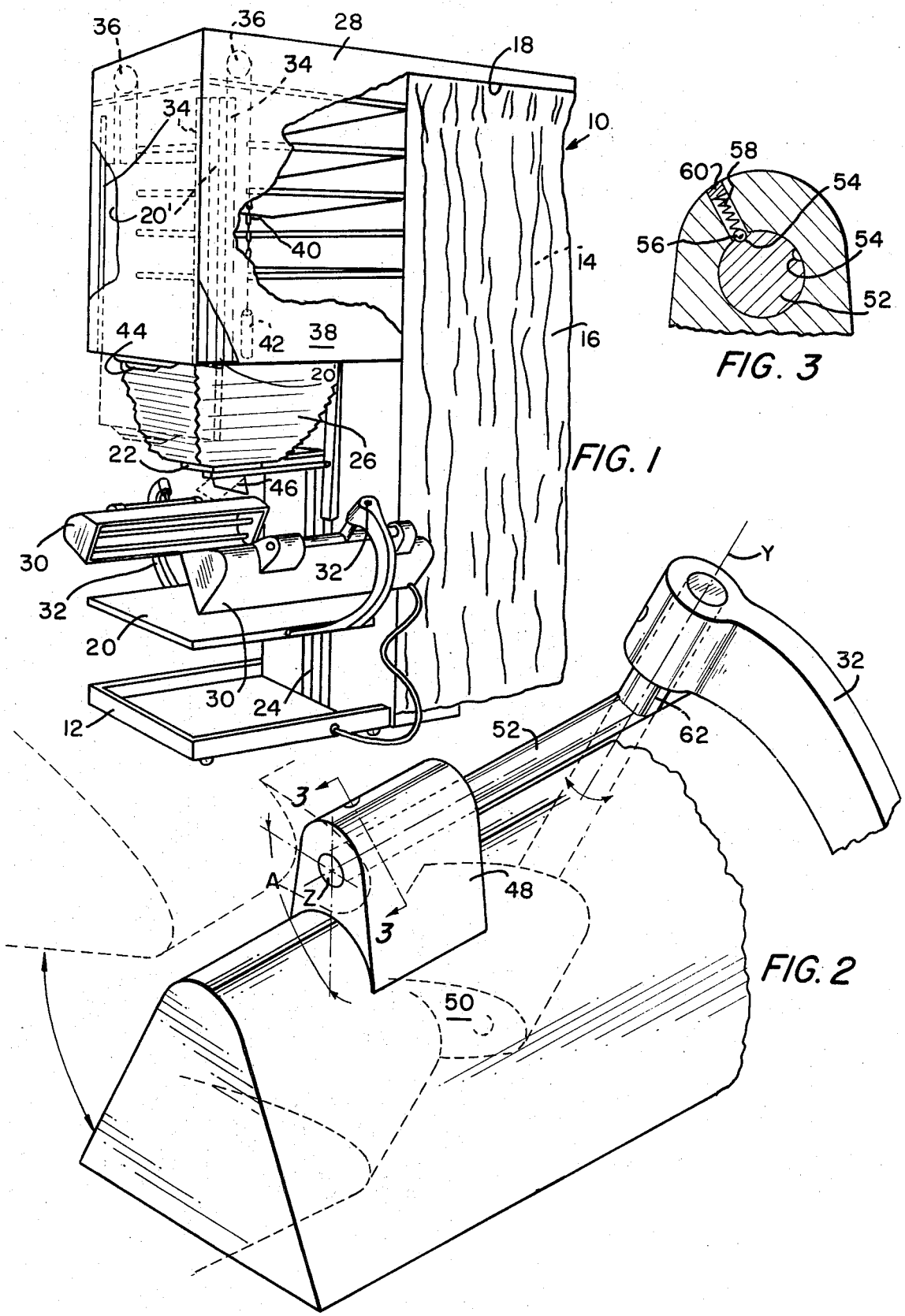

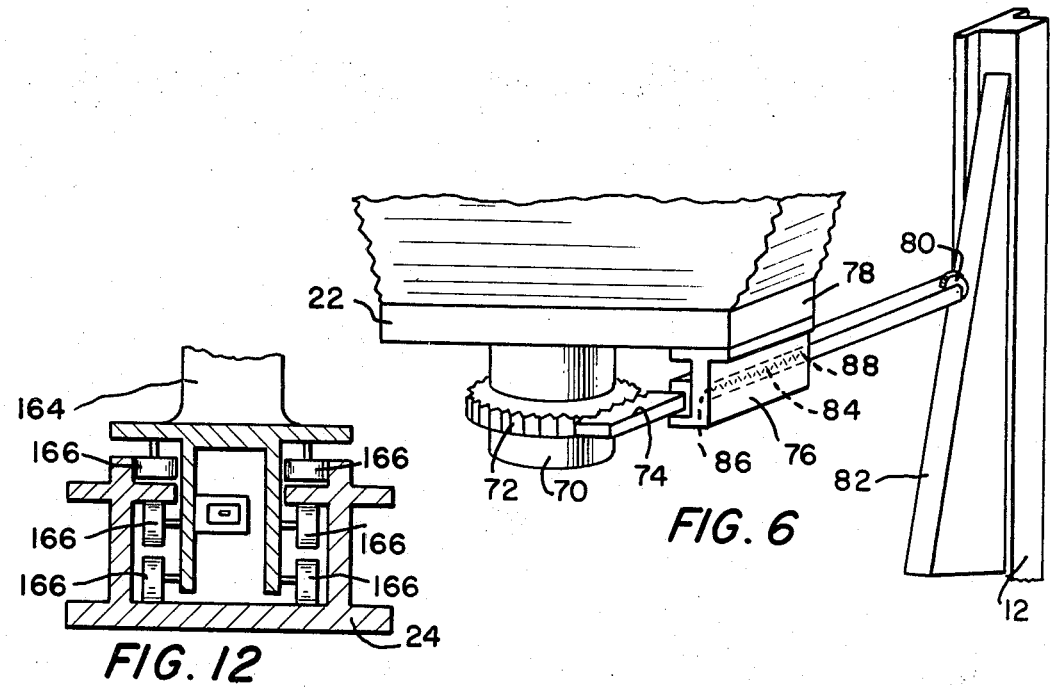
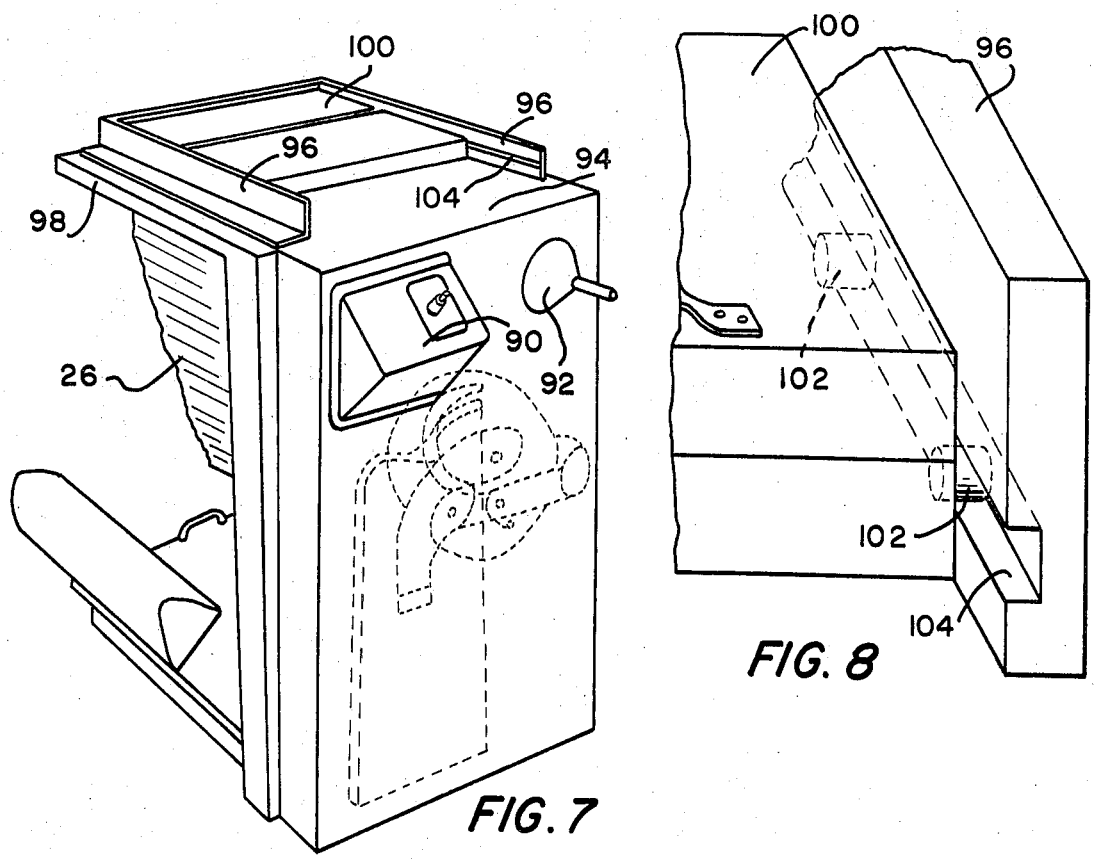

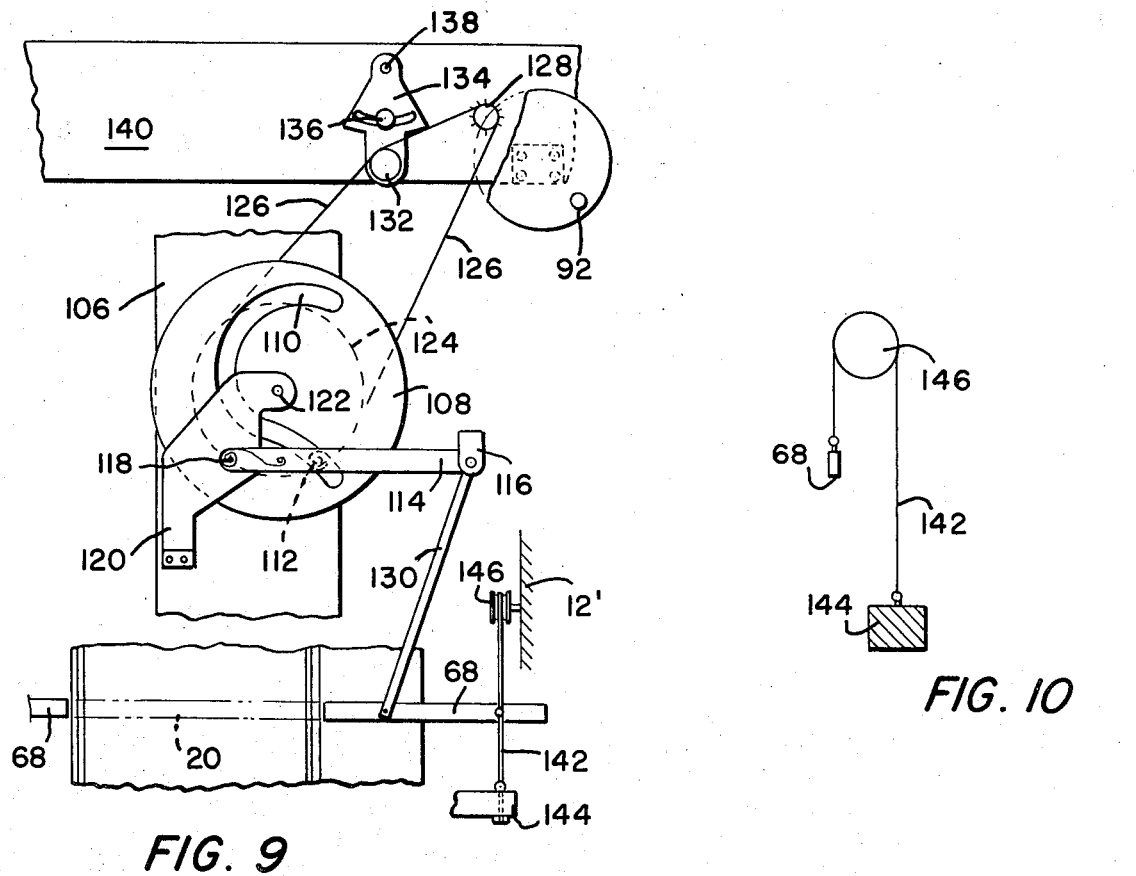
FIG. 9
FIG. 10
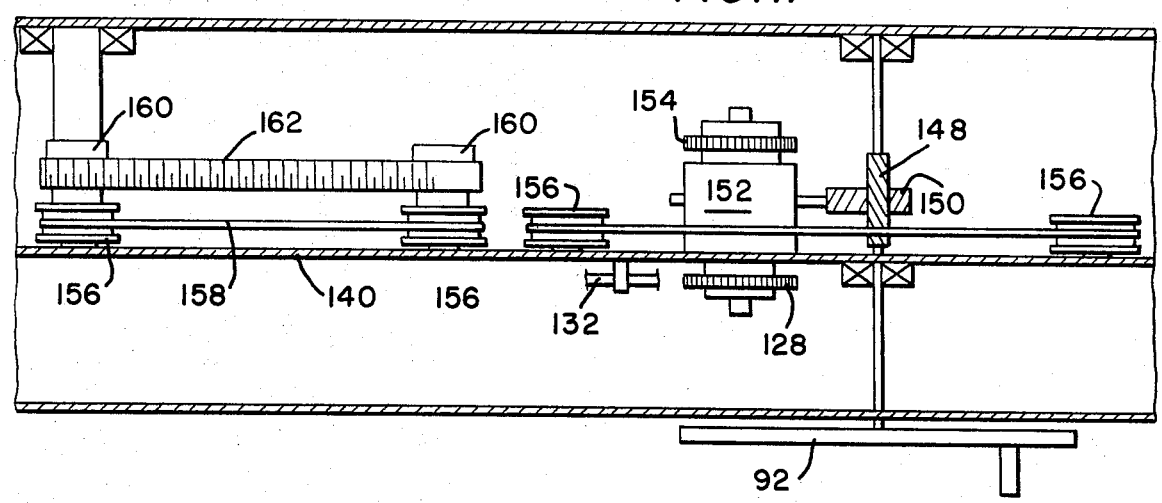
FIG. 11

MOBILE CAMERA ASSEMBLY

This invention pertains to camera assemblies, and in particular to mobile camera assemblies especially adapted to effect enlargement and/or reduction of the photographic objective.

Camera assemblies known in the prior art, and those which can effect enlargement and/or reduction of the photographic objective, typically have lens, or camera means movable relative to a prism, and a copyboard movable relative to such prism, the copyboard and lens or camera means being relatively and separately movable to realize the desired enlargement and/or reduction. However, it is burdensome having to move both the copyboard and the camera means individually. Also, the use of a prism requires the provisioning of space rearward, with respect to the prism viewing area or axis, for the photosensitive paper-carrying platen assembly. A total assembly, then, from what is known in the prior art camera assemblies, requires a first vertical space for the copyboard, and a second space adjacent thereto, and parallel thereto, for the lens and camera means and the platen assembly.

It is an object of this invention to avoid the limitations aforenoted as they obtain in prior art camera assemblies. It is another object of this invention to teach a mobile camera assembly which employs but one vertical space in which to deploy the lens or camera means, the copyboard, and the platen assembly. It is another object of this invention to set forth a novel mobile camera assembly comprising a base, said base having wheel means for effecting ready mobility thereof, camera means, first copyboard means, means movably supporting both said camera means and said first copyboard means on said base, wherein said camera means is disposed for direct, vertically oriented viewing of said copyboard means, and single control means, supported by said base, and coupled to said camera and copyboard means, selectively operative for moving both said copyboard means and said camera means into greater and lesser proximity to each other.

Further objects and features of this invention will become more apparent by reference to the following description, taken in conjunction with the accompanying figures, in which:

FIG. 1 is a vertical, elevational view, in perspective, of an embodiment of the novel mobile camera assembly, according to the invention, in which a portion of the camera housing is cut away to depict the provisioning therein of shelving for storage of photosensitive papers and the like;

FIG. 2 is a fragmented view of a portion of one lamp assembly, illustrative of the structured arrangement whereby the lamp assemblies may be articulated in two, transverse arcs;

FIG. 3 is a vertical cross-sectional view of the lamp assembly detent means, taken along section 3—3 of FIG. 2;

FIG. 6 is a vertical, elevational view of a portion of the lens or camera means, a vertical segment of the base, and an inventive automatic focusing assembly, according to my teaching;

FIG. 7 is an isometric view, in elevation, of the novel mobile camera assembly of my invention, depicting an operator's station, the same being opposite the view shown in FIG. 1, in which — for purposes of clarity — the camera housing and darkroom enclosure curtain are removed;

FIG. 8 is a fragmentary view of one side of the platen assembly and the slide track provisioned therefor;

FIG. 9 depicts my deployment of a novel cam wheel, chain-driven, which effects the optimum non-linear motion of the copyboard assembly relative to the lens or camera means, and the cam follower and reach arm associated therewith;

FIG. 10 is a side elevational view, partly in cross-section, of the copyboard assembly counterweight arrangement;

FIG. 11 is a plan view, with the operator's working surface cover removed, of the gear drive, scale or indicator tape, and copyboard assembly;

FIG. 12 is a limited, portional view of the camera assembly limb carriage on a section of the vertical track of the base;

Figure 4:
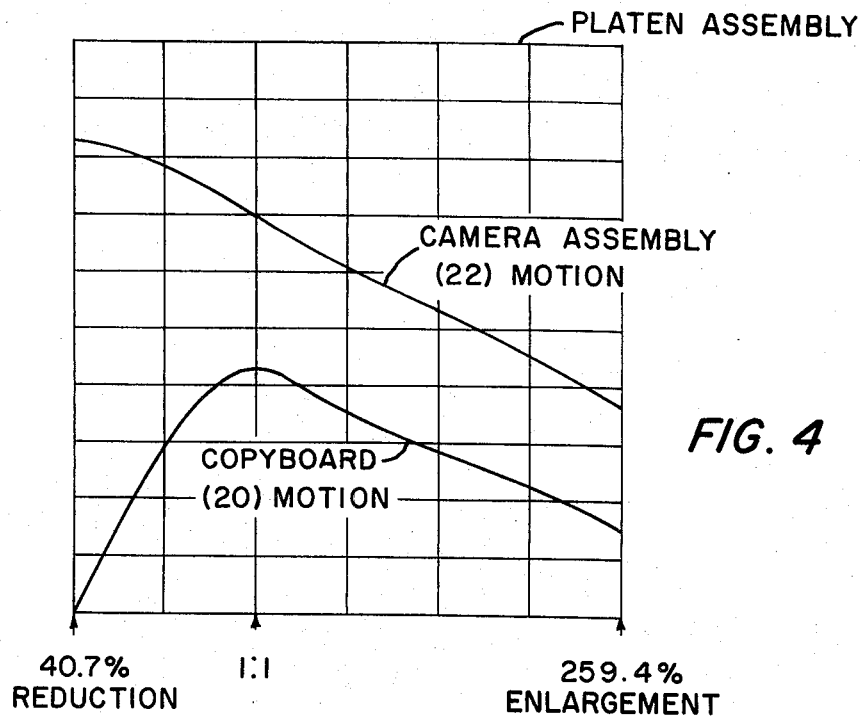
FIG. 4 is a plot of the relative movements of the lens or camera means and copyboard means on which it is shown that the former delineates a linear movement, and the latter delineates a non-linear movement.

As shown in FIG. 1, my novel camera assembly 10 comprises a base 12, a darkroom enclosure 14 defined by a curtain 16 slidably depending from a base-supported track 18, a first copyboard 20 and a lens or camera assembly 22 movably mounted on a slide track 24. The camera assembly 22 includes a bellows 26 fixed to a camera housing 28.

Lamp assemblies 30 are supported by arm assemblies 32 extending from the copyboard 20 to which the arm assemblies are fixed.

The camera housing 28 internally carries two pair of parallel tracks 34 which receive therebetween an ancillary, second copyboard 20' usable for direct copy (i.e., 1:1 ratio copying) work. Pulleys 36 fitted to the walls 38 of the camera housing 28 carry chains 40 by means of which the copyboard 20' is suspended, and counterweights 42 are fixed to the ends of the chains 40. A finger-grip handle 44 extends from the second copyboard 20' to facilitate the lowering of the copyboard 20' for use. Detent means, similar to those shown in connection with FIG. 2, can be used to locate the copyboard 20' at the proper position for the 1:1 camera viewing. A mirror 46, arranged, and having pivotal-mounting means (not shown) for disposition thereof, selectively, in one of two stable positions, depends from the camera assembly 22 for directing camera viewing to the copyboard 20'. When the mirror 46 is in the position shown in heavy lines, the camera has an unobstructed view of the primary or first copyboard 20; when the mirror 46, by over-center spring means (not shown), is moved to the positioning shown in dotted outline, the camera viewing is deflected to the ancillary, second copyboard 20'. Copyboard 20' is shown partially extended, in phantom, from the camera housing 28, relative to the tracks 34.

To provide for the illumination of the ancillary, second copyboard 20', I have arranged for the articulated movement of the lamp assemblies 30 in two, transverse arcs, about two independent axes; this is shown in FIG. 2. The lamp assemblies each have bosses 48 fixed to their reflector-hoods 50 which receive a first support shaft 52. Shaft 52 has two ball-recesses 54 formed therein, as seen better in cross-sectional view in FIG. 3, which alternately receive a restrained detent ball 56. A spring 58, secured by plug 60, secures the detent ball 56 within boss 48. Simply by rotating the reflector-hood 50 about shaft 52, the lamp assembly 30 can be directed for normal illumination of copyboard 20, or can be detented into a first of two adjusted positions for illumination of the ancillary, second copyboard 20'. A second, subsequent adjusted position is achieved by rotating the reflector-hood 50 about a similarly detented stub shaft 62 which extends perpendicularly from shaft 52 and which is received in an arm assembly 32. For the first adjustable positioning, then, the lamp assembly 30 is rotated about shaft axis "Z" to describe the arc "A," and for the second adjustable positioning, the lamp assembly is rotated about stub shaft axis "Y."

In FIG. 4 are plotted the lens or camera assembly/copyboard relative movements realized by my invention to effect an approximately 40.7 to 259.4 percent reduction/enlargement of the photographic objective. As the plotting depicts, the platen assembly (subsequently illustrated) lies on an upper reference plane. The camera assembly 22 is disposed therebelow and, in accord with the effect of my novel, single control means, moves linearly from a given close proximity to the platen assembly and distal spacing from the first copyboard 20, to a distal spacing from the platen assembly and a given close proximity to the copyboard 20. Simultaneously, during movement of the camera assembly 22, as the plotting shows, the first copyboard 20 rises sharply, initially, in closure toward the camera assembly 22, crests (at a 1:1 copying ratio disposition), and then withdraws from the platen assembly while barely and relatively closing upon the copyboard 20 thereafter. The initiation of the plotting, shown to the left of FIG. 4, is illustrative of the relative positionings of the principal components at a 40.7 percent reduction of the photographic objective, and those to the right of FIG. 4 illustrate the positionings at a 259.4 percent enlargment of the objective.

Figure 5:
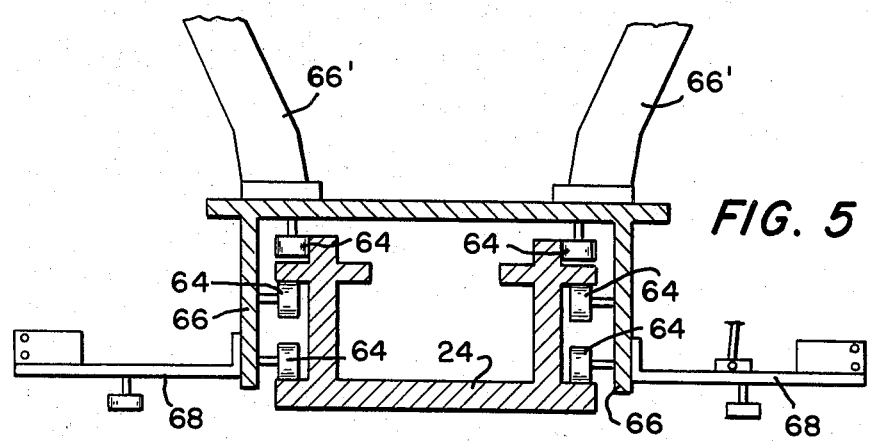
FIG. 5 is a plan view of a portion of the copyboard means, vertical track of the base, and the copyboard support arms.

Vertical track 24, as shown in FIG. 5, receives rollers 64 carried on limbs 66 which project from copyboard arms 66' in parallelism with the track 24. Limbs 66 terminate in horizontally disposed copyboard lift arms 68. As explained in the ensuing text, one of the lift arms 68 is used, in conjunction with a novel camming arrangement, to cause the optimum non-linear excursions of the copyboard.

The mirror 46 is not shown, in FIG. 6, more clearly to depict my inventive automatic focusing arrangement for the camera assembly 22. A lens cylinder 70 has a pinion gear 72 fitted thereon as an annulus. Gear 72 is in toothed engagement with a rack 74 slidably disposed in a carrier 76 secured to a lens holder 78. The end of the rack 74 which is opposite the gear/lens end carries a roller 80. Finally, roller 80 engages a camming surfaced member 82 fixed to a portion of base 12. A spring 84, fixed at one end 86 to the rack 74, and at the other end 88 to the carrier 76. insures the constraint of the rack roller 80 in constant engagement with the camming surfaced member 82. As the camera assembly 22 is lowered and raised, the gear 72, rack 74, and member 82 cooperate automatically to focus the camera lens properly for the elevation chosen.

In FIG. 7 I show the operator's camera controls 90 and movement effecting handwheel 92, and a second operator's working area/surface 94 (copyboard 20 defining a first operator's working area/surface). These elements, controls 90 and handwheel 92, normally, would be enclosed in the curtain 16 (FIG. 1). Guides 96 mounted to a portion 98 of base 12 slidably support a platen 100. As shown in enlarged, fragmented detail, in FIG. 8, the platen 100 has dowel pins 102 projecting therefrom and slidably support the platen in guide tracks 104. By this provisioning, the operator can pull the platen 100 up close to himself, charge it with photosensitive paper (or the like), and then slide it back into position over the camera/lens bellows 26. It is so arranged that, when the platen is pushed away, it automatically comes into a limit-stopped optimum positioning over the viewing lens.

The base 12 supports an upstanding strut 106, as shown in FIG. 9, to which a cam wheel 108 is rotatably mounted. The wheel 108 has a serpentine camming slot 110 formed therein which has a lug 112 in penetration thereof. Lug 112 extends from a cam follower 114, to which it is fixed, and the cam follower 114 mounts a clevis 116 at one end thereof. The opposite end of the cam follower 114 is pivotally mounted at 118 to a wheel support 120 which is bolted to the strut 106. A pivot pin 122 pivotally mounts the wheel 108 to the support 120. To the opposite side of the wheel 108, i.e., the side opposite the camming slot, is fixed a sprocket 124. A chain 126 driven from a gear/sprocket 128 drivenly engages the sprocket 124. Gear sprocket 128, as FIG. 11 shows in greater detail, is part of an integrated drive mechanism, the manual powering of which moves the camera assembly 22 linearly and the copyboard 20 non-linearly.

Clevis 116 (FIG. 9) pivotally mounts an extended reach arm 130 which, in turn, is pivotally coupled to one copyboard lift arm 68. Thus, when wheel 108 is caused to turn through approximately 270 degrees of arc, the copyboard is raised and lowered — through an approximately twelve inches of travel — relative to the base. The interaction of the lug 112 with the slot 110 causes the copyboard to describe the excursion plotted in FIG. 4, yet, the camera assembly 22 describes the linear motion set out in FIG. 4. In this way, the camera assembly 22 and copyboard 20 are selectively disposed in greater or lesser proximity to insure any photocopying in reduction down to 40.7 percent of the original or in enlargement up to 259.4 percent of the original.

A tensioning pulley 132 is engaged with the chain 126, and is rotatably mounted on an adjustable carrier 134. By backing off on a screw 136, and tilting the carrier 134 on its mounting bolt 138, the chain can be selectively tightened or slackened. Carrier 134 and gear-sprocket 128 are mounted to a horizontal web 140 which comprises a portion of the base 12.

Shown further in FIG. 9, and also in FIG. 10, is one half of the copyboard counterweighting arrangement. A chain 142 carries at one end thereof one end of a weight 144, the other end of the chain 142 being fixed to an extension of the one lift arm 68; an intermediate portion of the chain 142 is threaded about a pulley 146 rotatably mounted to an upright side member 12' of base 12.

Beneath the operator's second working area/surface 94 (FIG. 7) is mounted the drive mechanism for the camera assembly 22 and copyboard 20. To provide a clear view of the mechanism, the surface 92 is removed in FIG. 11 and it can be seen that the handwheel 92 rotates a first helical gear 148. Gear 148 is in mesh with a second helical gear 150 which transmits torque into a reduction gearbox 152. Power output from gearbox 152 rotates gear 128, which turns the camming wheel sprocket 124, and turns a further gear 154. Gears 128 and 154 are of like diameter, and rotate at the same r.p.m.; the latter of the two powers movement of the camera assembly.

Freely rotatable pulleys 156 are mounted to web 140 to carry a wire rope 158 thereupon; the pulleys 156 and rope 158 are the principal components of a pantograph arrangement which holds the first copyboard 20 in a true horizontal plane. Further freely rotatable pulleys 160 carry an indicator or scale tape 162 thereon; the tape 162 provides the operator a direct reading of the scale of reduction/enlargement to which he has moved his camera assembly 22 and copyboard 20. As explained in the following paragraphs, the tape 162 moves automatically in synchronism with the camera assembly 22.

Figure 14:
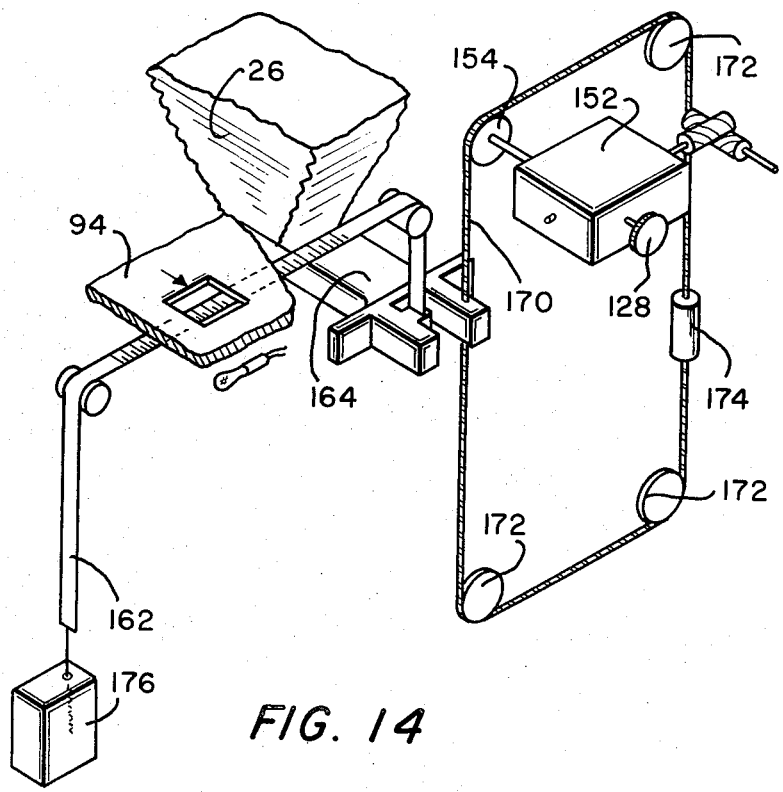
FIG. 14 is illustrative of the camera or lens assembly drive and counterweighting arrangement, and also depicts the scale or indicator tape movement means.

The camera assembly 22 drive and mounting is illustrated in FIGS. 12 and 14 where, it will be seen, a limb 164 extending fixedly from the camera assembly 22 is in penetration of the vertical track 24. The limb 164 carries rollers 166 in close-fitting engagement with the track 24. The limb 164 couples the ends of a chain 170 thereto, to either sides thereof, and the chain, in turn, is webbed about sprocket 154 and three base-supported pulleys 172. A camera counterweight 174 is interposed in one length of the chain 170 to ease the manipulation of the gear train and to effect camera movement. A resiliently powered retractor 176 holds one end of tape 162 while the other end of the tape is fixed to the limb 164; accordingly, as the camera makes its vertical excursions, the tape faithfully signals the photographing or copying scale.

Figure 13:
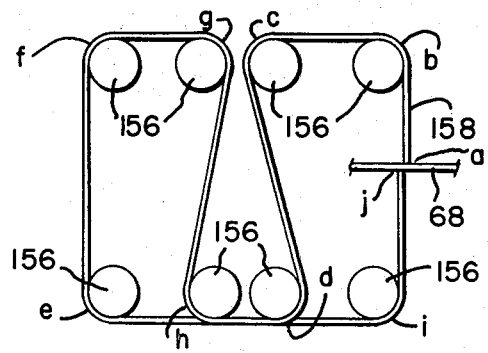
FIG. 13 is a schematic illustration of the copyboard assembly pantograph arrangement.

The pantograph arrangement mentioned earlier is schematically depicted in FIG. 13 where, as shown, six pulleys 156 cooperate with the wire rope 158 to insure a true leveling maintenance of the copyboard 20. Pulleys 156, like pulleys 172 and 160, are suitably rotatably mounted to the base 12, and the wire rope is fixed to opposite sides of the one lift arm 68. The wire rope 158 is deployed, as shown, from "a" to "j", in alphabetic progression about the pulleys 156.

Figure 15:
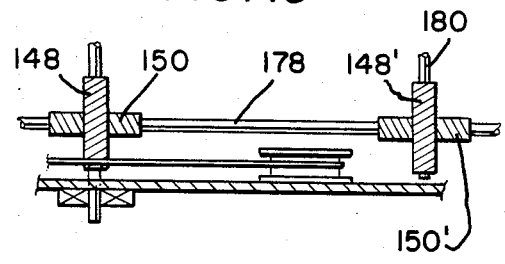
FIG. 15 illustrates an alternate gear drive arrangement by means of which camera or lens means and copyboard movement both can be effected, simultaneously, from the side of the novel camera assembly opposite to that shown in FIGS. 7 and 11.

In FIG. 15 I show an alternate arrangement for the manipulation of my novel mobile camera assembly. In this arrangement, I teach means enabling the attending of the camera assembly from the copyboard and lamp assembly side of the unit. In this embodiment, gear 150 carries an extending shaft 178. Shaft 178 carries a helical gear 150' thereon which gear meshes with another helical gear 148', this latter gear having a rearwardly extending shaft 180 integral therewith. My teaching here is to have shaft 180 (shown truncated here) extend through the unit to open adjacent to the bellows 26 on the other side of the unit. With a handwheel 92 fixed thereto, an operator can operate the novel camera assembly from that side of the unit.

While I have described my invention in connection with specific embodiments thereof, it is to be clearly understood that this is done only by way of example and not as a limitation to the scope of my invention as set forth in the objects thereof, and in the appended claims.

I claim:

1. Mobile camera assembly, comprising:

a base;

said base having wheel means for effecting ready mobility thereof;

camera means;

first copyboard means, defining a first operator's working surface;

means supporting both said camera means and said copyboard means on said base for movement, relative to said base, along a common vertical axis; wherein said camera means is disposed for direct, vertically-oriented viewing of said copyboard means;

single control means, supported by said base and coupled to said camera and copyboard means, selectively operative for moving both said copyboard means and said camera means into dispositions of greater and lesser proximity relative to each other;

platen means, for receiving photographic materials and the like, supported by said base; and guide means interposed between said platen means and said base supporting said platen means for selective movement of said platen means perpendicularly relative to said vertical axis; wherein said base includes means defining a second operator's working surface;

said guide means includes means for supporting said platen means for slidable movement thereof across said second operator's working surface; further including means defining a dark-room enclosure, enveloping said second operator's working surface, carried by said base;

said camera means comprising a housing fixed to said base and bellows; wherein said camera housing defining therewithin a materials storage area which opens on said enclosure;

second copyboard means movably mounted within and extendable from said camera housing; and positionable at a right angle to said first copyboard means, and, reflector means, having two stable operative dispositions, pivotally depending from said camera means, intrusive of said axis in one of said dispositions to reflect light from said second copyboard means onto said camera means.

2. Mobile camera assembly, according to claim 1, wherein:

said single control means include handwheel means extending from said base on one given side of said axis in adjacency to said second working surface.

3. Mobile camera assembly, according to claim 1, further including:

counterweight means coupled to said second copyboard means and to said camera housing for restraining said second copyboard means in a prescribed, extended disposition, relative to said camera housing and said camera means, to facilitate a 1:1 ratio viewing of said second copyboard means by said camera means.

4. Mobile camera assembly, according to claim 1, further including:

lamp means for illuminating said first and second copyboard means; and articulated support means suspending said lamp means from said first copyboard means manually operative for selectively disposing said lamp means for illumination of said first copyboard means and said second copyboard means, selectively.

5. Mobile camera assembly, according to claim 1, wherein:

said camera means comprises a lens cylinder; and further including a camming means mounted on said base and to said camera means operative, automatically in response to movement of said camera means, to rotate said lens cylinder to effect automatic focusing of said camera means.

6. Mobile camera assembly, according to claim 1, wherein:

said second operator's working surface is disposed on one given side of said axis; and said single control means includes a shaft for a handwheel, said shaft extending from said base toward a side of said base which is opposite to said one given side of said axis, for providing control of said camera assembly from said opposite side.

7. Mobile camera assembly, according to claim 1, further including:

scale-tape means for variably and visually presenting a scale of photographic enlargement and reduction realizable from said lesser and greater proximity dispositions of said camera and copyboard means, coupled to one of said camera and said copyboard means and to said base, operative in synchronous response to a movement of said one means visually to present said scale.

8. Mobile camera assembly, comprising:

a base;

said base having wheel means for effecting ready mobility thereof;

camera means;

first copyboard means, defining a first operator's working surface;

means supporting both said camera means and said copyboard means on said base for movement, relative to said base, along a common vertical axis; wherein said camera means disposed for direct, vertically-oriented viewing of said copyboard means;

single control means, supported by said base and coupled to said camera and copyboard means, selectively operative for moving both said copyboard means and said camera means into dispositions of greater and lesser proximity relative to each other;

platen means, for receiving photographic materials and the like, supported by said base;

guide means interposed between said platen means and said base supporting said platen means for selective movement of said platen means perpendicularly relative to said vertical axis; wherein said base includes means defining a second operator's working surface to one side of the camera means;

said guide means includes means for supporting said platen means for slidable movement thereof across said second operator's working surface; further including, means defining a dark-room enclosure, enveloping said second operator's working surface, carried by said base; and a camera housing fixed to said base; wherein a lens means is connected to said camera housing by bellows; and said camera housing defines therewithin a materials storage area which opens on said enclosure.

\* \* \* \* \*